United States Patent [19]

Nilsson et al.

[11] Patent Number: 4,584,158
[45] Date of Patent: Apr. 22, 1986

[54] METHOD FOR PRODUCING A BIAXIALLY ORIENTED CONTAINER FROM A BLANK OF THERMOPLASTIC MATERIAL

[75] Inventors: Claes T. Nilsson, Löddeköpinge; Kjell M. Jakobsen, Skanör, both of Sweden

[73] Assignee: Petainer S.A., Neuchatel, Switzerland

[21] Appl. No.: 587,232

[22] Filed: Mar. 7, 1984

[30] Foreign Application Priority Data

Mar. 10, 1983 [SE] Sweden ................................. 8301291

[51] Int. Cl.$^4$ ....................... B29C 49/12; B29C 49/16
[52] U.S. Cl. ..................................... 264/529; 264/532; 264/534; 425/529; 425/530
[58] Field of Search .............. 264/532, 531, 534, 529, 264/530; 425/529, 530

[56] References Cited

U.S. PATENT DOCUMENTS 3,662,049  5/1972  Gilbert .................................. 264/532
4,108,937  8/1978  Martineu et al. ............... 264/532 X

FOREIGN PATENT DOCUMENTS 2076731 12/1981 United Kingdom ................ 264/532
2102724  2/1983 United Kingdom ................ 264/532

Primary Examiner—Jan Silbaugh
Attorney, Agent, or Firm—Roberts, Spiecens & Cohen

[57] ABSTRACT

A method and a device for production of a temperature-stable, biaxially oriented container of thermoplastic material. In a first moulding stage a blank (40) is placed in a blow mould (12) after which a mandrel (15) extends the blank in its axial direction to a length exceeding the axial length of the future container. The length of the stretched material, in an axial section through the stretched blank, is then reduced at a predetermined temperature, and the reduction being made to a profile length substantially agreeing with the profile length for corresponding material portions in an axial section through the future container. In a second moulding stage the stretched blank is expanded to abut against the walls of the mould. The expansion takes place at a point in time for and/or at a speed allowing the reduction of the length of the stretched material, due to shrinkage to have time to be concluded before the material comes into contact with the walls of the mould.

14 Claims, 10 Drawing Figures

METHOD FOR PRODUCING A BIAXIALLY ORIENTED CONTAINER FROM A BLANK OF THERMOPLASTIC MATERIAL

FIELD OF THE INVENTION

The present invention relates to a method for production of a temperature-stable, biaxially oriented container from a blank of thermoplastic material, and more specifically, to, in a first moulding stage with the blank placed in a mould, extending the blank in its axial direction and thereafter in a second moulding stage to expanding the preform obtained through the stretching of the blank into abutment against the walls of the mould at a point in time for and/or with a speed in the expansion causing the reduction in the length of the stretched material effected by the temperature of the material to be concluded before the material comes into contact with the walls of the mould.

BACKGROUND

There are many contexts in which there is a need for containers of plastics materials where the shape of the container does not alter at elevated temperature. This requirement is particularly pressing in applications where the containers are filled with pressurized contents, e.g. carbonated drinks, since the increased internal pressure at elevated temperature contributes towards deforming the shape of the container.

In the case of containers of polyethylene terephthalate, often abbreviated as PET, care is taken to ensure that the container consists of oriented material. Such material is characterised in that after stretching it shrinks in the direction of stretching when the temperature of the material is raised. An attempt has been made to remedy this problem by temperature-stabilizing the material, which implies that the material in the moulded container is thermo-crystalized by heating to a temperature above the glass transition temperature of the material. This also releases the internal stresses in the oriented material which were incorporated into it in conjunction with its stretching.

Packs, e.g. for beverages, are manufactured in very large quantities, for which reason a reduction of the quantity of material in every individual pack contributes towards lowering the total costs. It is also desirable from the point of view of the consumer that the price that is paid for a purchased item relates to as large as possible an extent to costs for the product and to as small an extent as possible to costs for the packaging. Thus both the consumer and the manufacturer have strong reasons for wishing to keep the costs for the packaging as low as possible.

In order to reduce the quantity of material in bottles of PET by as much as possible, one chooses to allow the material in at least the container body to consist of biaxially oriented material. Cf e.g. U.S. Pat. No. 3,733,309.

In recent times new technology has also been presented, refer e.g. to the British patent application GB No. 2 092 943 in accordance with which a preform consisting of material stretched in an axial direction and oriented is formed from a primarily amorphous blank in a separate processing stage. In a subsequent processing stage the orifice section of the preform is usually provided with a shape coresponding to the shape of the orifice section of the future container, after which the preform is placed in a blow mould and expanded to abutment against the walls of the blow mould in order to form the container. Cf the British patent application GB No. 2 076 731. The axially stretched material possesses improved strength characteristics, which enables reduction of the quantity of material in the neck and orifice sections of the container. In conjunctin with the pretreatment the axially oriented material in the preform is also temperature-stabilized as a rule. A container which is produced in accordance with the technology described in this paragraph thus consists of a lesser quantity of material for a certain inner space than a container which is moulded from an amorphous blank with unchanged material thickness in the orifice and neck sections.

It is known from e.g. U.S. Pat. No. 4,264,558 of a temperature-stabilized container, where the container body consists of biaxially oriented material and the orifice and neck sections of the container consist of thermo-crystallized material, whereby the thermocrystallization is allowed to proceed as along as the material in the neck and orifice sections is opaque. The thermo-crystallization in accordance with the technology described in this patent requires relatively long processing times. Moreover, it is so that the container described in the patent contains a greater quantity of material than containers for an equivalent volume that are produced in accordance with the technology described in the preceding paragraph.

SUMMARY OF THE INVENTION

The present invention is directed to a method for production of a container consisting of material oriented in the axial direction of the container, in addition to which at least the material in the container body has an orientation in the circumferential direction of the container. The container produced in accordance with the invention is moreover in certain applications of the invention temperature-stable. The invention eliminates the need to pretreat the blank which is reshaped into the container in a separate treatment stage, since the invention makes it possible to achieve a predetermined stretching in the axial direction of the container and thus orientation and even maximum orientation of the material in the neck section and body of the container, once the blank has been placed in a blow mould, in addition to which in accordance with the invention the material is temperature-stabilized prior to and/or during the expansion of the stretched blank against the walls of the blow mould.

In the application of one embodiment of the invention a blank is placed in a blow mould, once it has been heated to a temperature above the glass transition temperature of the material. By means of a mechanical device, e.g. a mandrel, the material in the blank which in the future container forms its neck section and body is stretched (in order to form a preform), to a length exceeding the profile length of said container sections. The stretching length is adapted to the temperature of the material and the stretching speed used and in a preferred embodiment of the invention also adapted in order to achieve a material extension equivalent to that which the stated material would have obtained in the free stretching of the material so that it undergoes material flow. The stretching length is moreover adapted so that the length of the stretched material, once it has undergone free shrinkage at a minimum temperature coresponding to the maximum utilization temperature stated for the container, agrees with the profile length of equivalent portions of the moulded container.

After stretching, the mandrel returns to a position allowing the aforementioned material shrinkage. It has proved, surprisingly, that the preform formed from the stretched blank has very weak material shrinkage in its circumferential direction and primarily retains its inner diameter during the shrinkage of the material in the axial direction of the preform. In one embodiment of the invention this property is utilized in order to rapidly adjust the material of the preform to and maintain the material at the predetermined temperature above the glass transition temperature of the material at which the shrinkage of the material is terminated. The dimensions of the mandrel and the blank are thereby adapted primarily solely to that which is required in order not to scratch the inner surface of the blank when the mandrel is introduced therein, since such a defect could effect the surface finish of the moulded container.

In one embodiment of the invention, the expansion takes place by means of supplying a heated pressurized medium in order to ensure that the material is maintained at an elevated temperature during a sufficiently long period of time in order that shrinkage of the material shall have time to be concluded and thus at a temperature equivalent to the maximum utilization temperature stated for the container.

In a preferred embodiment of the invention the mould walls are heated to a temperature exceeding the glass transition temperature of the material. After expansion, the internal overpressure in the container is maintained in order to ensure that the material abuts the mould walls during as long a period of time as is required in order to release stresses incorporated into the material during the expansion in the circumferential direction and stablize the material in the container formed during blowing.

In conjunction with the procedure indicated above it should be observed that the material shrinkage in the direction of stretching can quite easily be allowed to proceed simultaneously as the material is expanded in the circumferential direction of the final container. In order to achieve the required effect it is however necessary that the shrinkage of the material in the direction of stretching has had time to be concluded before the material comes into contact with the mould walls, since the friction against the mould walls prevents all further material shrinkage. The desired sequence of the moulding cycle is achieved in accordance with the invention only in that all or only a certain part or the shrinkage of the material in the direction of stretching takes place before the material expansion in the future circumferential direction is commenced, or that the expansion is implemented at such a low speed that the shrinkage of the material in the axial direction has time to be concluded before the material comes into contact with the mould walls. In some embodiments the internal pressure is relesed totally in an intermediate stage of the expansion to let the material shrinkage to be concluded before the final expansion of the material to abut against the walls of the mould is started.

It has proved advisable in certain embodiments to use a specific amount of pressurized medium e.g. air for preform expansion. This ensures that the internal pressure in the preform is at its maximum at the beginning of expansion and falls continuously during the expansion cycle. Moreover, certain applications make use of a pressure vessel communicating with the interior of the preform, where the volume and/or the pressure can be varied. The variation in the volume and/or pressure is used in order to control the blow-out speed of the preform. In alternative embodiments of the invention more than one pressure vessel is employed, whereby the first pressure vessel is connected to the interior of the preform in order to achieve a partial blowing out of the preform into the container. Once the shrinkage of the material has been virtually or completely concluded, the next pressure vessel is connected to the interior of the partial blown-out preform in order to achieve its expansion against the mould walls. The utilization of two or more separate pressure vessels makes it possible to control and adapt the blowing out of the preform simply to the shrinkage speed of the material stretched in the axial direction.

In a preferred embodiment of the invention the blank has an orifice section consisting of temperature-stabilized material stretched in the axial direction of the blank, where the stretching gives rise to a crystallization equivalent to the crystallization the material obtains in free drawing that causes a material flow, while the remaining part of the blank consists of amorphous material. During the reshaping of the blank into the container all amorphous material, in certain cases with the exception of the material in the bottom section of the blank, is stretched in accordance with the aforementioned procedure. By this means a container is produced in accordance with the invention which consists of material oriented in the axial direction of the container with an orientation equivalent to the orientation the material obtains in free drawing that causes a material flow. The container is moreover temperature-stable up to a temperature range equivalent to the temperature at which the shrinkage of the material is concluded and/or the temperature of the mould wall against which the material is blown out.

The invention is particularly suitable for use in already existing and installed blowing equipment, as it can be altered by means of relatively simple operations and modifications in order to suit the new technology.

BRIEF DESCRIPTION OF THE FIGURES OF THE DRAWING

The invention is described in greater detail in conjunction with the appended drawing having a number of figures, wherein.

DESCRIPTION OF PREFERRED EMBODIMENTS

Figure 3:
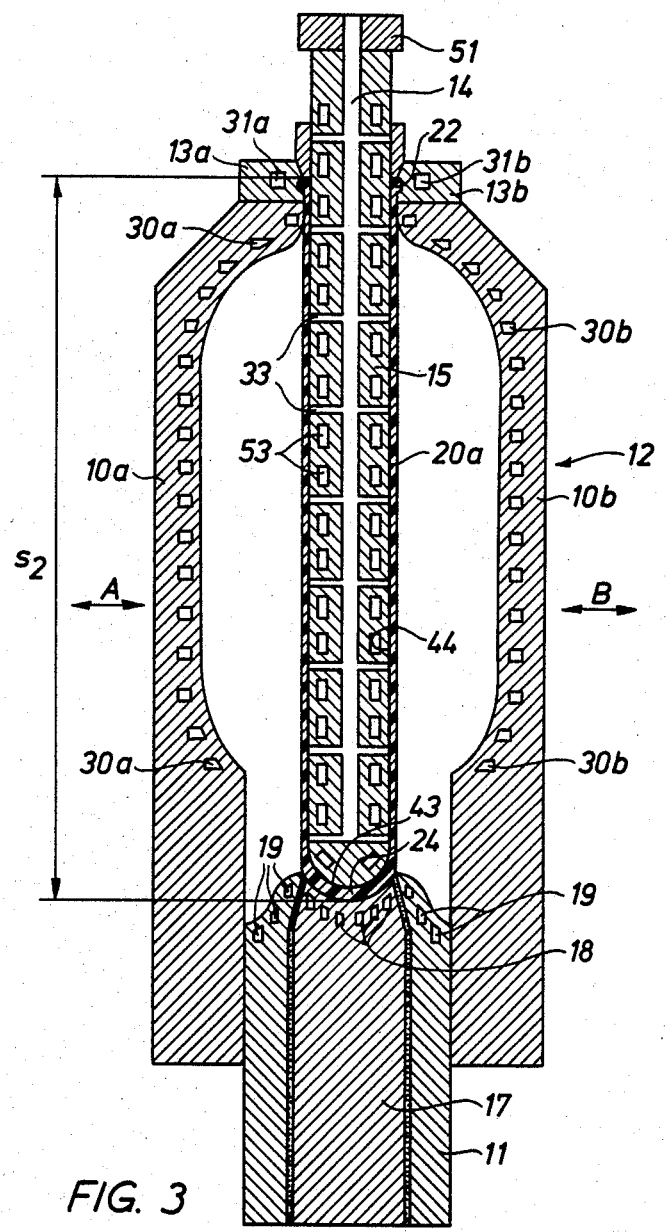
FIG. 3 shows a corresponding longitudinal section once the stretched blank has been shrunk in its axial direction.
Figure 4:
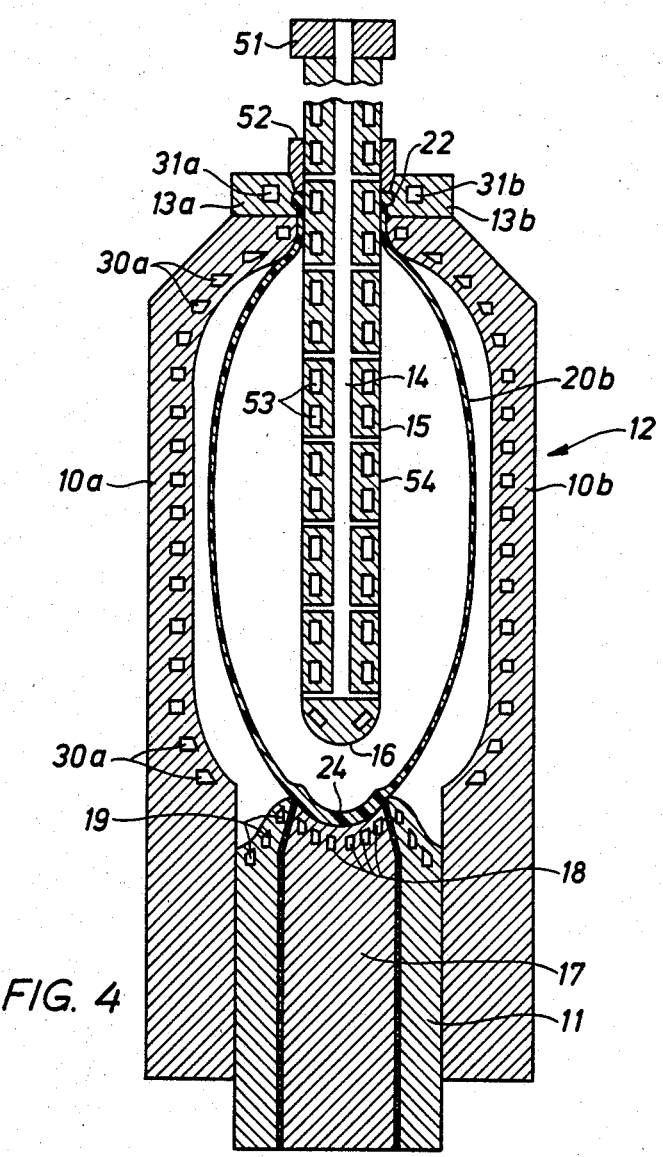
FIG. 4 shows a corresponding longitudinal section during reshaping in progress of the preform and with the bottom section in motion towards the orifice section of the preform.
Figure 5:
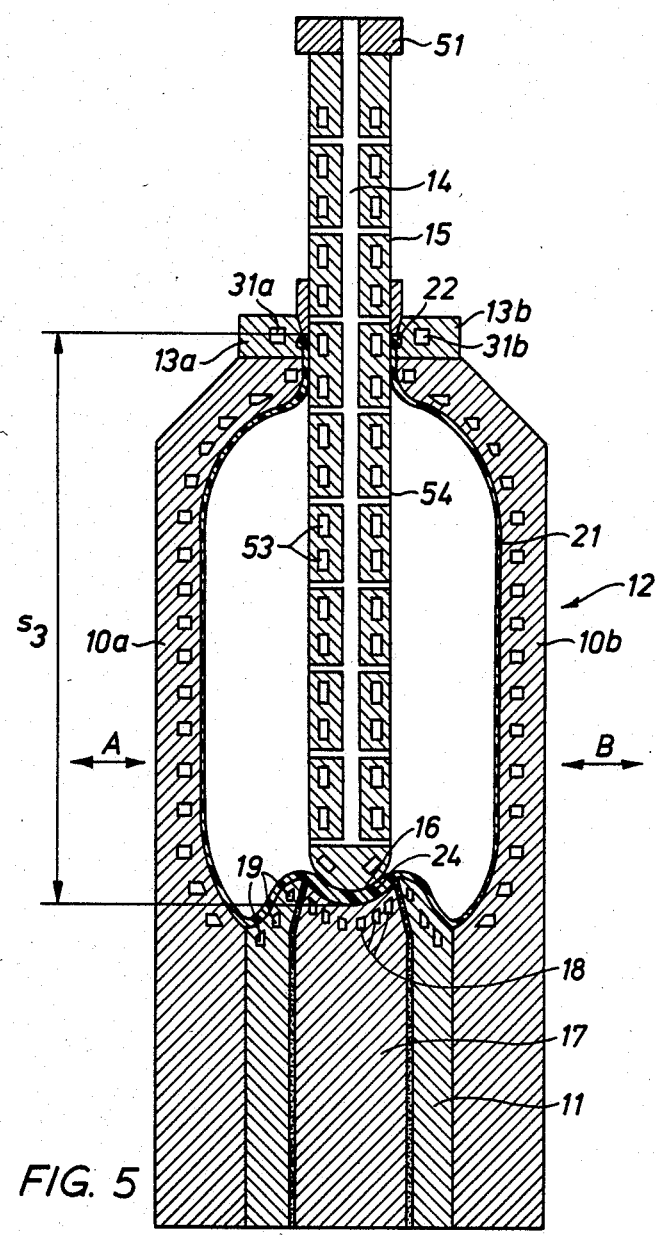
FIG. 5 shows a corresponding longitudinal section with the bottom section in its uppermost position and with the blown-out preform abutting the walls of the mould.

FIGS. 1–5 contain two mould halves 10 a,b moveable in the direction of the arrows A, B to and from a position which is shown in the figures. The mould halves collaborate with a third mould component in order to together form a blow mould 12 where the third mould component forms the bottom section 11 of the blow mould. By means of drive devices (not shown in the figures) the bottom section is displaceable between a lower position (FIG. 1) and an upper positin (FIG. 5). In the upper position the bottom section together with the mould halves forms a composite blow mould with an inner shape agreeing with the shape of the future container.

The bottom section is disposed with a central mould part 17 preferably thermally insulated from the rest of the bottom section. A number of channels 18 for transfer of liquid for temperature regulation are disposed in the central mould part. Channels 19 with a corresponding function are also disposed in the remaining part of the bottom section. The mould halves 10 a,b are also disposed with channels 30 for temperature regulation. Furthermore, there are disposed in the vicinity of upper parts of the mould halves gripping devices 13 a,b which collaborate with a mandrel guide 50 for retention of a blank 40 in its orifice 22. The gripping devices also contain channels 31 for transfer of liquid for temperature regulation. The walls of the blow mould have in the figures the reference designation 34.

A mandrel 15 with an outer delineation surface 54 is disposed in order to be moved to drive devices (not shown in the figures) in the axial direction of the blow mould whereby the mandrel slides in the mandrel guide 50. In its upper part the mandrel is disposed with an adjustable stopping device 51 which in the lower position of the mandrel abuts the stop surface 52 of the mandrel guide. By means of the adjustable stopping device 51 it is thus especially simple to regulate the stroke of the mandrel. The mandrel is moreover disposed with liquid channels 53 for temperature adjustment of the mandrel and is in addition provided with a main channel 14 for a pressure medium which passes to the surface of the mandrel via lateral channels 33 and thus into the interior space of the preform. The mandrel terminates in its lower section with a moulding surface 16.

Figure 1:
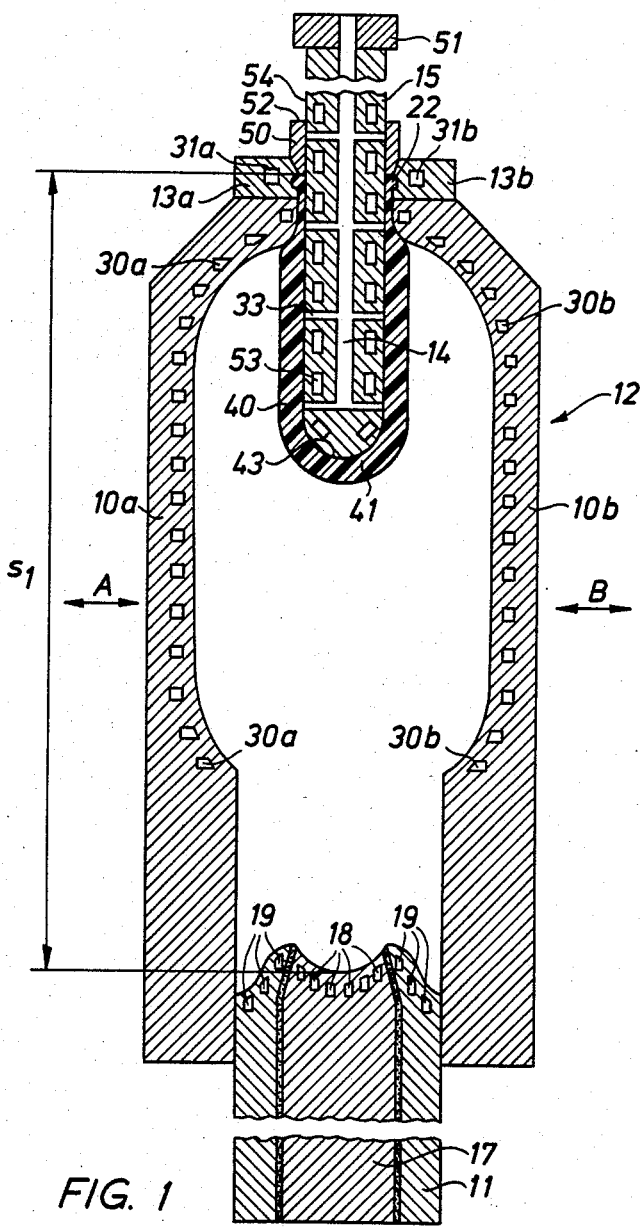
FIG. 1 shows a longitudinal section through a blow mould with a blank placed therein and with the bottom section thereof in a lower position.

FIG. 1 shows in particular the blank 40 with a closure 41 at one end. Prior to being placed in the blow mould the blank is formed in its orifice section to a shape corresponding with that of the future container.

Figure 2:
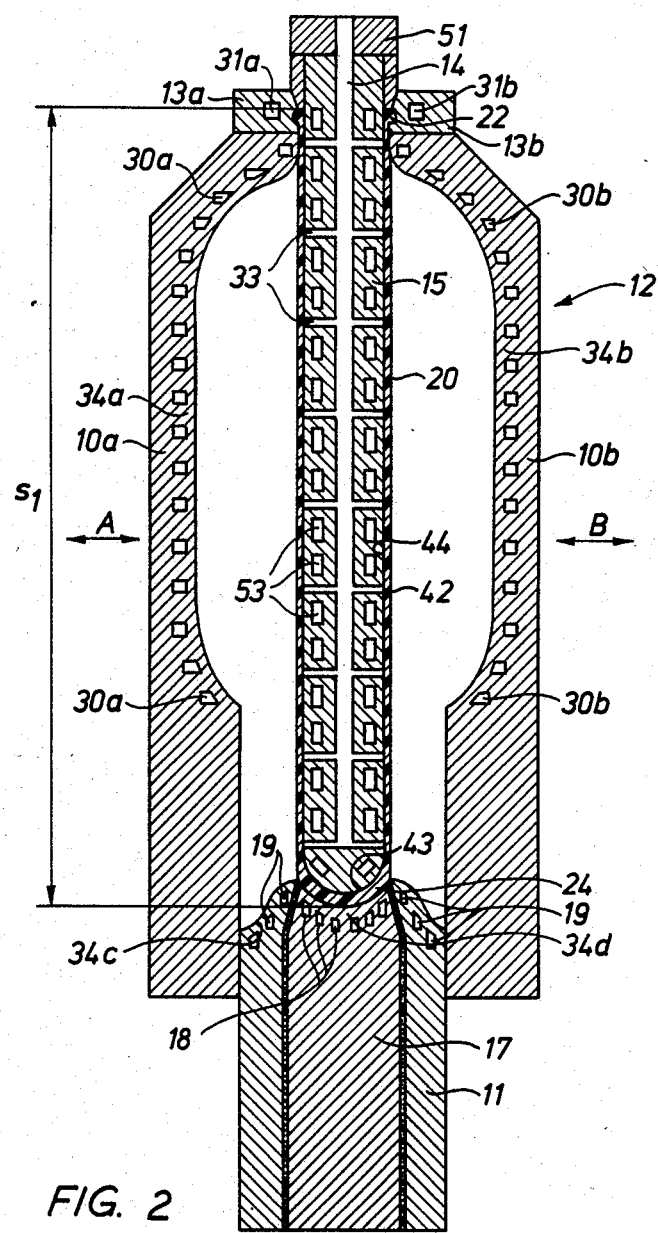
FIG. 2 shows a corresponding longitudinal section once the blank has been stretched in its axial direction.

FIG. 2 shows a preform 20 of length $s_1$ whereby the preform has been obtained once the blank 40 has been stretched in its axial direction, FIG. 3 shows the preform 20a once it has been shrunk in its axial direction through heating and has thus attained the length $s_2$, in addition to which FIG. 4 shows the preform 20b during reshaping into the container. FIG. 5 shows the moulded container 21 when it is still in the blow mould and FIG. 6 the container once it has been removed from the blow mould. The container has an axial length $s_3$ which is less than the length $s_2$. The inner delineation surface has the reference designation 44 in the cylindrical portion of the preform and the designation 43 in the enclosure of the preform.

Figure 6:
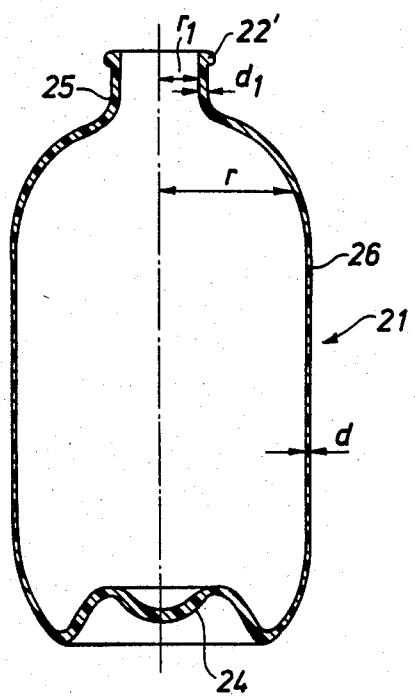
FIG. 6 shows an example of a finished container.

FIG. 6 shows in detail an embodiment of a container in accordance with the invention. The container has a neck portion 25 with an upper part that forms an orifice edge 22'. The actual container body 26 has a central material portion 24 in its bottom section. In the figure the reference designations $r_1$ and $d_1$ respectively show the radius and the material thickness respectively of the neck portion and r and d respectively the radius and material thickness respectively of the container body in an arbitrary plan at right-angles to the axis of the container.

The material thickness d varies in the container body with the radius r of the container body so that the ratio between the material thickness d in the container body and the material thickness $d_1$ in the neck portion is approximately equal to the ratio between the radius $r_1$ of the neck portion and the radius r of the container body. The neck portion consists of axially oriented material and the container body of biaxially oriented material.

Figure 7:
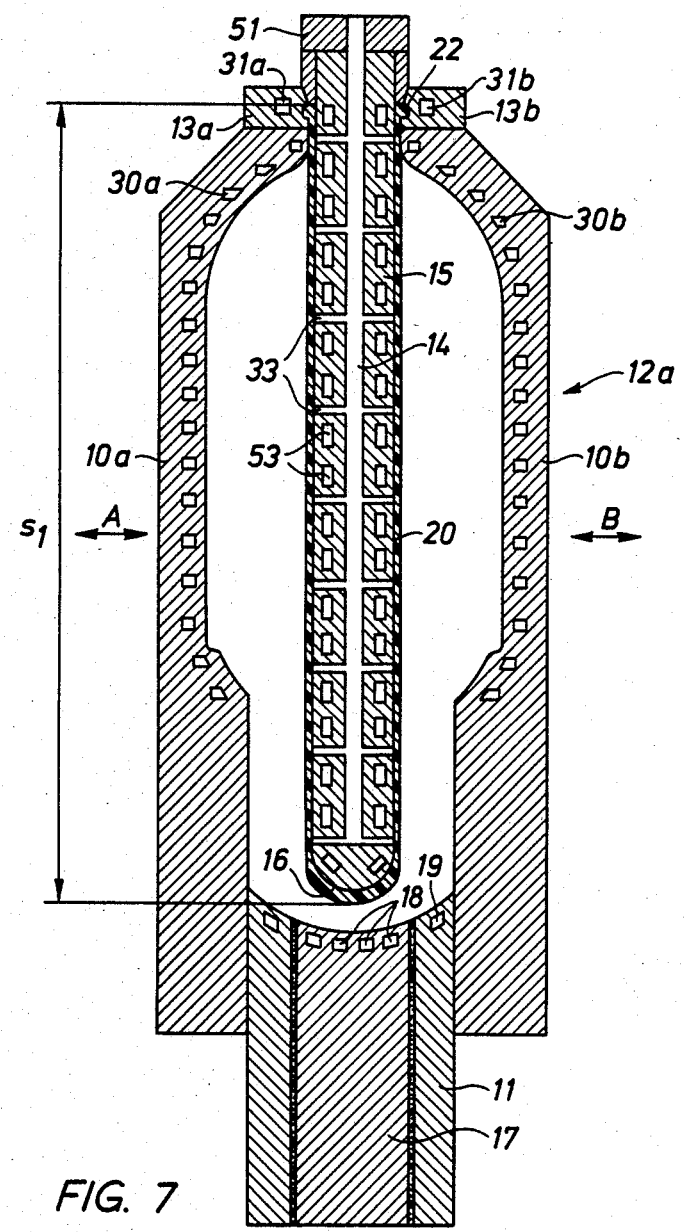
FIGS. 7-9 show longitudinal sections corresponding to those shown in FIGS. 2, 3 and 5 of a blow mould with a primarily spherical moulding surface in its bottom section.
Figure 8:
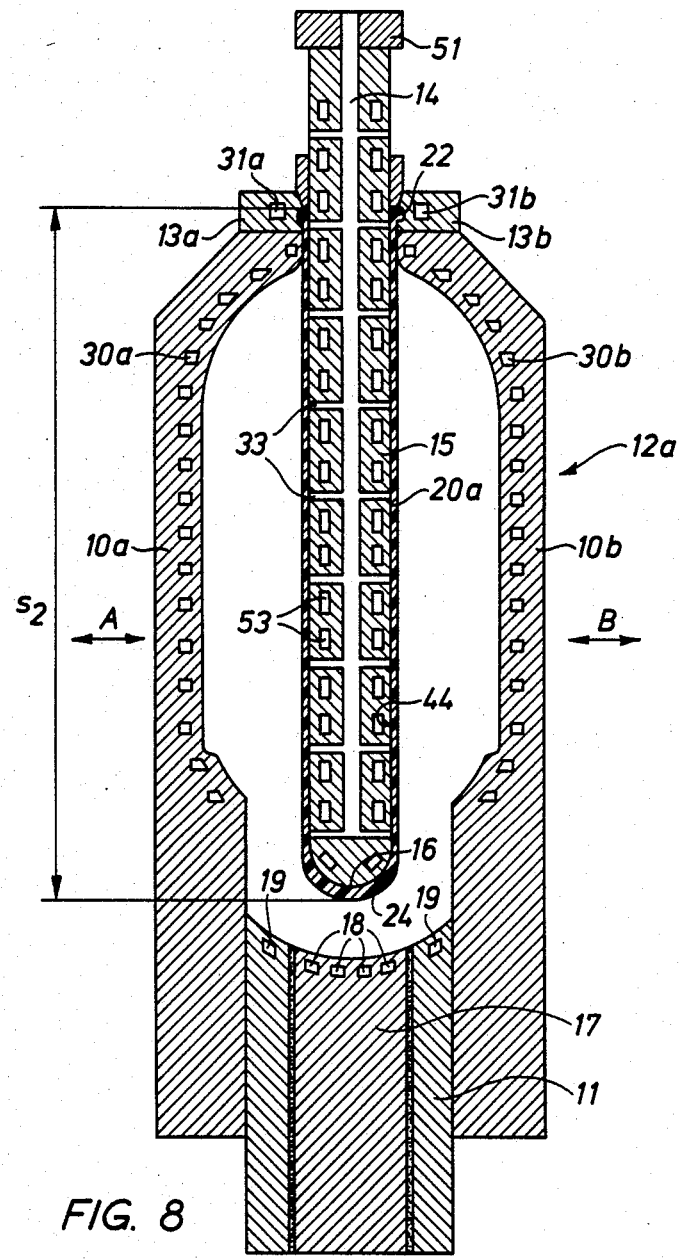
Figure 9:
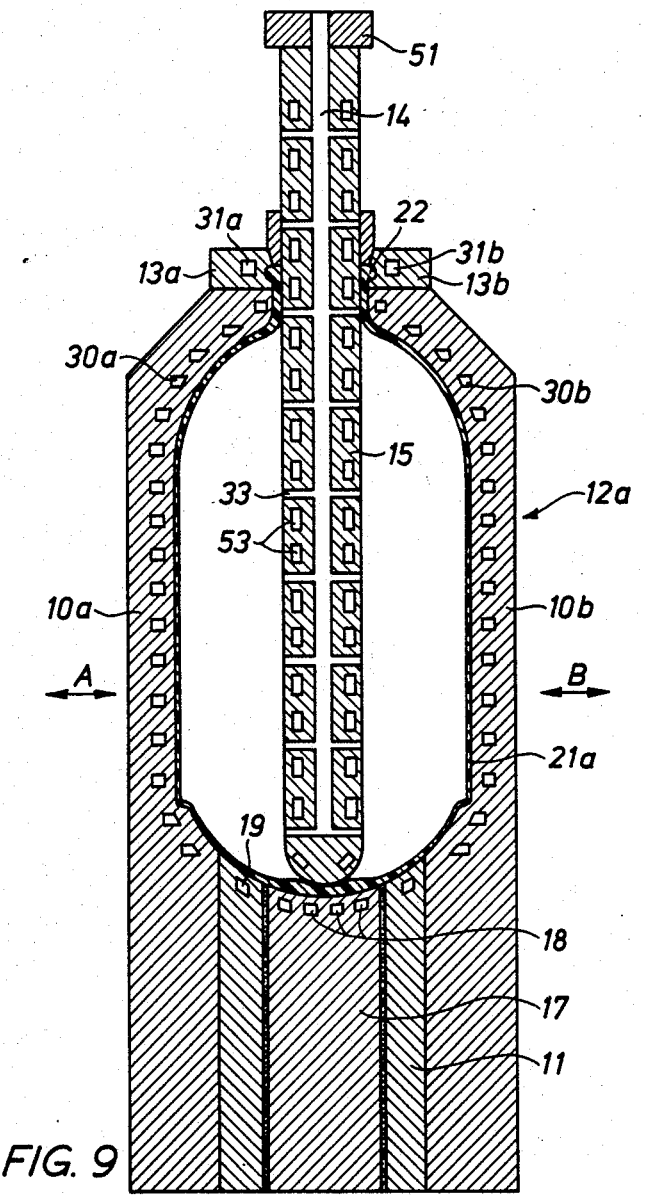

FIGS. 7–9 contain a modified embodiment of the blow mould 12a where the bottom section of the blow mould is adapted for moulding of a container with an arched bottom which is adapted for the attachment of a separate base. In other respects the figures agree completely with those previously described and corresponding devices have corresponding reference designations.

Figure 10:
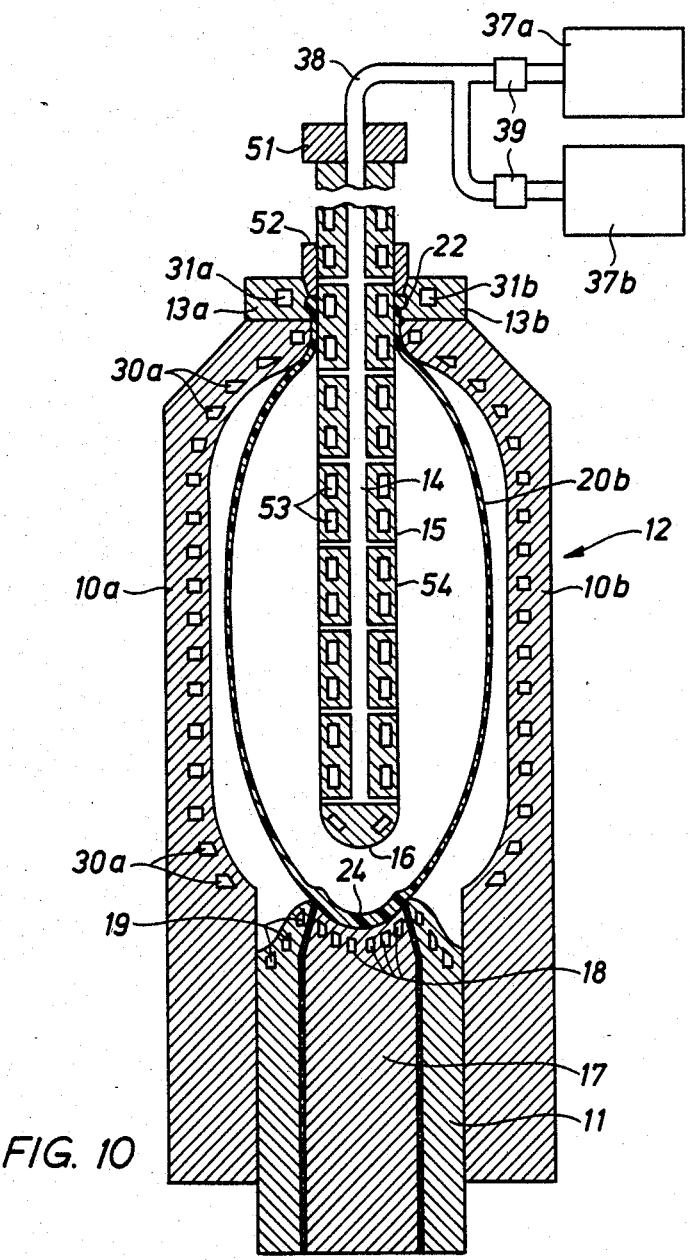
FIG. 10 shows a longitudinal section through a blow mould collaborating with pressure vessels in order to utilize a specific quantity of pressurized medium in the expansion of the stretched blank.

FIG. 10 shows an embodiment of a blow mould where in accordance with the invention the main channel 14 of the mandrel 15 is connected to pressure vessels 37 a,b for a pressure medium. The connection is made via a connection line 38 in which shut-off and opening valves 39 are installed. In other respects the figure is in agreement with FIG. 4.

In the application of the invention the blank 40 is placed in the position shown in FIG. 1 with a temperature in the body of the blank exceeding the glass transition temperature of the material. The aforementioned drive devices (not shown in the figures) then moved the mandrel 15 to the position shown in FIG. 2 or FIG. 7 whereby the blank is stretched in its axial direction and the preform 20 of stretched material is formed. Here it is assumed that the preform 20 in FIG. 7 is formed from a blank placed in a blow mould corresponding to that which is shown in FIG. 7. After stretching the stretched material has a length exceeding the axial profile length of those parts of the future container which are moulded from the stretched material. In a preferred embodiment the stretching length, the temperature of the material and the stretching speed used are adapted to each other in order to attain a material extension equivalent to that which the stated material would have obtained in free stretching of the material so that it underwent material flow.

The stretching of the blank 40 gives rise to a certain abutment between the inner surface of the blank and the outer delineation surface 54 of the mandrel, which means that in the case of the preform 20 formed the stretched material rapidly attains the same temperature as that of the mandrel. The mandrel is set to a temperature which as a rule exceeds the glass transition temperature of the material, which causes the length of the stretched material to decrease. During the material shrinkage, the mandrel is moved upwards in the blow mould simultaneously as those stresses which are incorporated into the material in its stretching are released.

After shrinkage the length of the stretched material is maximized and also fixed at the final length the material obtains in shrinkage. It is thus not possible to re-stretch the material. On the other hand the material can be shrunk further if it is heated to a higher temperature than that at which the material shrinkage is concluded. Furthermore, the material is exceptionally unwilling to expand as well in other directions if attempts are made to do so at temperatures below the temperature at which the shrinkage is concluded at least if the temperature is significantly below the shrinkage temperature. All continued reshaping of the preform 20a formed by shrinkage must therefore take place at a higher temperature than that of which the material shrinkage is concluded. This is possible both in that the material shrinkage and thus the fixing of the material takes a certain time, and in that if material shrinkage is prevented, the fixing is mainly absent.

In order to expand the preform 20a against the walls 34 of the blow mould the preform is thus heated to a temperature exceeding the temperature at which the shrinkage is concluded after which the interior of the preform is pressurized. By this means the preform is expanded to abut against the walls 34 of the blow mould and thereby assumes the required final shape. In expansion the material is oriented, which releases energy in the latter in the form of thermal energy. The thermal energy contributes towards maintaining the temperature of the material at a temperature where expansion of the material can proceed. In those applications where a temperature-stable container is required, the moulding surfaces of the walls are at an elevated temperature which is chosen so as to exceed the stated maximum utilization temperature for the container.

It has been stated in the preceding description that the shrinkage of the material in the direction of stretching, once the preform 20a has been formed, is concluded before the expansion in the circumferential direction commences. In certain examples of application expansion commences however already before the shrinkage is concluded. By this means the time up to the abutment of the material against the mould walls is utilized in order to conclude the material shrinkage. In order to ensure that no abutment is obtained before the shrinkage is concluded, the pressure vessel 37 a,b shown in FIG. 10 are used in certain embodiments. The quantity of pressure medium in each pressure vessel, the temperature and the pressure of the pressure medium are thereby adapted to the inner volume of the future container. In the expansion of the preform in a first stage only the pressure medium from the first pressure vessel 37a is supplied to the interior of the preform, whereby the preform expands and assumes the shape that is shown in FIG. 10. After a certain time during which the material shrinkage in the direction of stretching is concluded, pressure medium from the second pressure vessel 37b is supplied in a second stage whereby the final shaping of the container takes place.

It will be seen from the figures that the bottom section 11 of the blow moulding during the reshaping of the blank into the container is moved in the axial direction of the blow mould in order in a lower position to allow the stretched preform to reach lower down in the blow mould with its lower section than corresponds to the position of the moulding surface when the container is formed. The moveable bottom section of the blow mould and the terminating moulding surface 16 of the mandrel 15 are used in certain applications in order by enclosure of material for the bottom section of the future container to form the section. Through temperature control of both mandrel and bottom section of the blow mould the material for the future bottom section is thereby adjusted to the desired moulding temperature in addition to which in certain applications thermal crystallization of the material is also achieved.

The figures show an embodiment of the blank where its orifice section consists of already stretched and oriented material. The invention is naturally also applicable to other embodiments of blanks, e.g. blanks where the orifice section consists of amorphous material, the orifice section has threads etc.

The invention is described in the preceding in reference to a blank, a preform and a container with a primarily circular cross-section. The invention is however not restricted to such a cross-section but is also applicable for other cross-sections.

The invention has been described in the preceding in conjunction with the material polyethylene terephthalate but is in itself applicable to many other thermoplastics of e.g. polyester or polyamide. Examples of such other materials are polyhexamethylene adipamide, polycaprolactame, polyhexamethylene sebacamide, polyethylene-2.6- and 1.5-napthalate, polytetramethylene-1.2-dioxybensoate and copolymers of ethylene terephthalate, ethylene isophthalate and also other polymeric plastics as polycarbonate.

We claim:

1. In a method of producing a temperature-stable container of thermoplastic material from a blank which has a closure at one end, wherein the blank is heated to a temperature above the glass transition (TG) of the material, and is reshaped to abut against mould walls in order to form the container, the improvement comprising, in a first moulding stage, extending the blank in its axial direction to stretch the material of the blank to achieve axial orientation of the stretched material determined by the conditions of the magnitude of the extension, material temperature and stretching speed, the axially stretched material of the heated, extended blank tending to undergo shrinkage after the axial extending step due to internal stresses induced in the material and in a second moulding stage expanding the stretched material at elevated temperature into abutment with the mould walls at a controlled time and speed of expansion such that reduction in length of the stretched material due to shrinkage takes place during said second moulding stage and is concluded before the material comes into contact with the walls of the mould whereby to substantially eliminate said internal stresses.

2. The method as claimed in claim 1 comprising heating the mould walls to a temperature which exceeds the glass transition temperature of the material.

3. The method as claimed in claim 1 wherein the blank is expanded by a heated pressure medium.

4. The method as claimed in claim 1 wherein the blank is extended by a mandrel disposed within the blank, which moves axially and abuts against the inner surface of said closure of the blank.

5. The method as claimed in claim 4 wherein the outer surface of the mandrel is heated to a temperature exceeding the maximum utilization temperature for the future container by at least 2° C.

6. The method as claimed in claim 1 wherein the walls of the mould are heated to a temperature exceeding the maximum utilization temperature for the future container by at least 2° C.

7. The method as claimed in claim 1 wherein the length of the blank prior to shrinkage, the length of the shrunk blank and the profile length of the future container are related to each other so that the profile length of the shrunk blank corresponds to the profile length of the future container for those parts of the blank and the container respectively that consist of material stretched in its axial direction.

8. The method as claimed in claim 1 wherein a specific quantity of pressurized medium is used for the expansion of the blank in the circumferential direction so that the internal pressure in the blank is greatest at the beginning of expansion.

9. The method as claimed in claim 8 wherein a pressurized medium from more than one pressure vessel is used for the expansion of the blank in the circumferential direction, the first pressure vessel being connected to the interior of the blank to achieve a partial blowing out of the blank and a subsequent pressure vessel is connected to the interior of the partially expanded blank when the shrinkage of the material in the axial direction of the blank has been substantially concluded.

10. The method as claimed in claim 1 wherein in said second stage the expanding of the stretched material is first effected at relatively low pressure which expands the stretched material into a state where it will not contact the mould walls and thereafter at relatively higher pressure to cause the material to come into contact with the mould walls.

11. The method as claimed in claim 1 wherein in the second stage the control of the time and speed of expansion of the stretched material is effected by controlling the pressure of the pressure fluid introduced into the extended blank.

12. The method as claimed in claim 1 wherein in said first moulding stage said blank is axially stretched to a length in which the profile length of the stretched blank in a vertical plane exceeds the profile length of the container by an amount corresponding to the reduction in length due to shrinkage.

13. A method of forming a container from orientable thermoplastic material comprising:
    introducing into a mold with a movable mold part, a hollow blank of thermoplastic material including a side wall and a closed end,
    axially stretching the blank by an internal mandrel which is axially displaced and engages the closed end of the blank to produce axial orientation of the material of the side wall of the blank,
    expanding the blank in the mold to contact the walls thereof to form the container,
    displacing the closed end portion of the stretched blank in correspondence with the expanding of the blank such that the material of the side wall is not stretched in a plane perpendicular to the direction of expanding and thereby the material does not undergo any axial strain due to elongation and said expanding produces circumferential stretching and circumferential orientation of the material in said side wall independent of and superimposed on said axial orientation,
    the axially stretched material of the axially stretched blank tending to undergo shrinkage after the axial stretching due to internal stresses in the material,
    said expanding of said blank being effected at a controlled time and speed of expansion such that the reduction in length of the stretched material due to shrinkage is concluded before the material comes into contact with the mold walls whereby to substantially eliminate said internal stresses.

14. The method as claimed in claim 13 wherein the blank is axially stretched at a temperature above the glass transition temperature of the material of the blank.

* * * * *